(12) United States Patent
Liu

(10) Patent No.: US 12,548,338 B2
(45) Date of Patent: Feb. 10, 2026

(54) OBJECT SAMPLING METHOD AND IMAGE ANALYSIS APPARATUS

(71) Applicant: VIVOTEK INC., New Taipei (TW)

(72) Inventor: Cheng-Chieh Liu, New Taipei (TW)

(73) Assignee: VIVOTEK INC., New Taipei (TW)

( * ) Notice: Subject to any disclaimer, the term of this patent is extended or adjusted under 35 U.S.C. 154(b) by 204 days.

(21) Appl. No.: 18/510,606

(22) Filed: Nov. 15, 2023

(65) Prior Publication Data
US 2024/0193951 A1 Jun. 13, 2024

(30) Foreign Application Priority Data
Dec. 7, 2022 (TW) .................................. 111146905

(51) Int. Cl.
| | |
|---|---|
| *G06V 20/52* | (2022.01) |
| *G06T 7/194* | (2017.01) |
| *G06V 10/25* | (2022.01) |
| *G06V 10/44* | (2022.01) |
| *G06V 10/56* | (2022.01) |
| *G06V 10/60* | (2022.01) |
| *G06V 10/762* | (2022.01) |

(52) U.S. Cl.
CPC .............. *G06V 20/52* (2022.01); *G06T 7/194* (2017.01); *G06V 10/25* (2022.01); *G06V 10/44* (2022.01); *G06V 10/56* (2022.01); *G06V 10/60* (2022.01); *G06V 10/762* (2022.01)

(58) Field of Classification Search
CPC ........ G06V 20/52; G06V 10/25; G06V 10/44; G06V 10/56; G06V 10/60; G06V 10/762; G06T 7/194
See application file for complete search history.

(56) References Cited

U.S. PATENT DOCUMENTS

| | | | | |
|---|---|---|---|---|
| 2018/0173969 | A1* | 6/2018 | Pillai ...................... | G06V 20/56 |
| 2019/0311491 | A1* | 10/2019 | Liu .......................... | G06T 7/90 |
| 2020/0005459 | A1* | 1/2020 | Berezhna ............. | G06V 20/698 |
| 2020/0099875 | A1* | 3/2020 | Mikes .................. | H04N 25/633 |
| 2021/0019892 | A1* | 1/2021 | Zhou ...................... | G06T 7/155 |
| 2021/0407124 | A1* | 12/2021 | Hinek .................... | G06Q 30/06 |
| 2022/0078352 | A1* | 3/2022 | Kikuchi ................. | H04N 23/88 |

(Continued)

FOREIGN PATENT DOCUMENTS

| | | |
|---|---|---|
| TW | 200535719 | 11/2005 |
| TW | 201618539 A | 5/2016 |
| TW | 202025087 A | 7/2020 |

*Primary Examiner* — Peet Dhillon
(74) *Attorney, Agent, or Firm* — Winston Hsu

(57) ABSTRACT

An object sampling method is applied to an image analysis apparatus with an image receiver and an operation processor. The image receiver acquires an image stream. The object sampling method includes transforming color space of at least one surveillance image in the image stream, computing saturation and gradient of specific pixels within the at least one surveillance image, setting a bonding box within the at least one surveillance image, and computing a background score relevant to the saturation and value of all pixels in the bonding box, and comparing the background score with a first sampling condition so as to determine whether the at least one surveillance image is applicable for the image analysis apparatus via a comparison result of comparing the foreground score with the first sampling condition.

20 Claims, 5 Drawing Sheets

(56) References Cited

U.S. PATENT DOCUMENTS

2022/0164961 A1* 5/2022 Lee .................. G06T 7/194
2022/0292845 A1* 9/2022 Moosaei ............. G06V 10/764
2022/0383105 A1* 12/2022 Moon ................ G06V 10/50

* cited by examiner

OBJECT SAMPLING METHOD AND IMAGE ANALYSIS APPARATUS

BACKGROUND OF THE INVENTION

1. Field of the Invention

The present invention relates to an object sampling method and an image analysis apparatus, and more particularly, to an object sampling method with preferred recognition speed and accuracy and a related image analysis apparatus.

2. Description of the Prior Art

With advance of the surveillance apparatus, the surveillance system includes multiple cameras installed on different locations. If a suspicious person is photographed by one camera, the surveillance system needs to waste lots of systematic computation for retrieving the surveillance images with the suspicious person appearing on the surveillance region of the photographed camera captured at other points of time, as well as the surveillance images with the suspicious person appearing on the surveillance region of other cameras captured at any point of time. In actual application, if the suspicious person appears on an area with the colorful background or an area with obvious edges, the object recognition technology is easily interfered by the background with high color saturation and high brightness variation for mistaking a similar object for the target object. Therefore, design of an image analyzing and sampling method of effectively decreasing the background interference and increasing the recognition accuracy is an important issue in the related surveillance industry.

SUMMARY OF THE INVENTION

The present invention provides an object sampling method with preferred recognition speed and accuracy and a related image analysis apparatus for solving above drawbacks.

According to the claimed invention, an object sampling method is applied to an image analysis apparatus with an image receiver and an operation processor, and the image receiver acquires an image stream. The object sampling method includes transforming color space of at least one surveillance image in the image stream, computing saturation of specific pixels within the at least one surveillance image, setting a bonding box within the at least one surveillance image, and computing a background score based on the saturation relevant to all pixels in the bonding box, and comparing the background score with a first sampling condition, so as to determine whether the at least one surveillance image is applicable for the image analysis apparatus in accordance with a comparison result of comparing the foreground score with the first sampling condition.

According to the claimed invention, an image analysis apparatus includes an image receiver and an operation processor. The image receiver is adapted to acquire an image stream. The operation processor is electrically connected to the image receiver, and adapted to transform color space of at least one surveillance image in the image stream for computing saturation of specific pixels within the at least one surveillance image, set a bonding box within the at least one surveillance image, and compute a background score based on the saturation relevant to all pixels in the bonding box and compare the background score with a first sampling condition, so as to determine whether the at least one surveillance image is applicable for the image analysis apparatus in accordance with a comparison result of comparing the foreground score with the first sampling condition.

The object sampling method and the image analysis apparatus of the present invention can preferably utilize the saturation and the brightness variation of the surveillance image to generate the background image, set the bonding box within the surveillance image by the object recognition technique, and compute the background score of the color parameter of the pixels within the background image located at position corresponding to the bonding box within the surveillance image. Then, the present invention does not select the surveillance image with the background having high color saturation or the background having sharp edges for the following object tracking computation in accordance with the comparison result of the background score and the first sampling condition; the bonding box of the remaining surveillance image can have the plain background and/or the background with the slowly changed greyscale, and can effectively avoid background interference and increase the recognition accuracy when comparing with the searching image. The image analysis apparatus of the present invention can include on or several image receivers; if the operation processor receives the searching image provided from one of the image receivers, the operation processor can utilize the object sampling method to rapidly analyze the surveillance image acquired by the said image receiver at another point of time, and further analyze the surveillance image acquired by other image receiver at any point of time, so as to select the surveillance images that are not interfered by the background, for effectively decreasing the systematic computation and increasing the recognition speed and accuracy of the object tracking computation.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
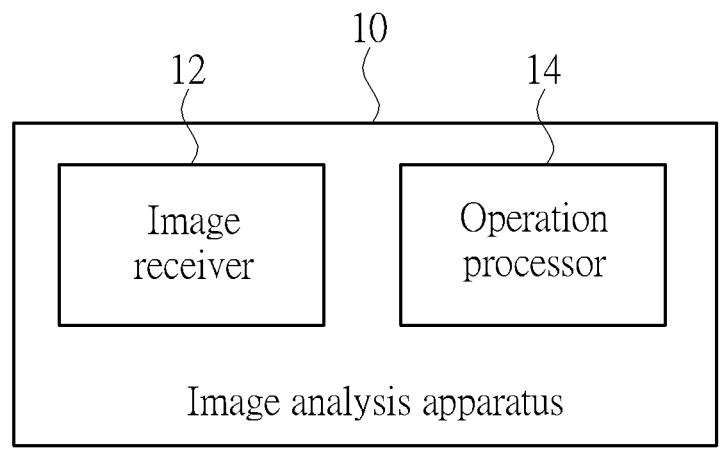
FIG. 1 is a functional block diagram of an image analysis apparatus according to an embodiment of the present invention.

Please refer to FIG. 1. FIG. 1 is a functional block diagram of an image analysis apparatus 10 according to an embodiment of the present invention. The image analysis apparatus 10 can include an image receiver 12 and an operation processor 14 electrically connected to each other. The image receiver 12 can be a surveillance camera used to directly capture a surveillance region of the image analysis apparatus 10 for acquiring an image stream; further, the image receiver 12 may receive the image stream captured by an external camera. The operation processor 14 can be a built-in processor of the surveillance camera or an external processor outside the surveillance camera. Application of the image receiver 12 and the operation processor 14 can depend on a design demand.

Figure 2:
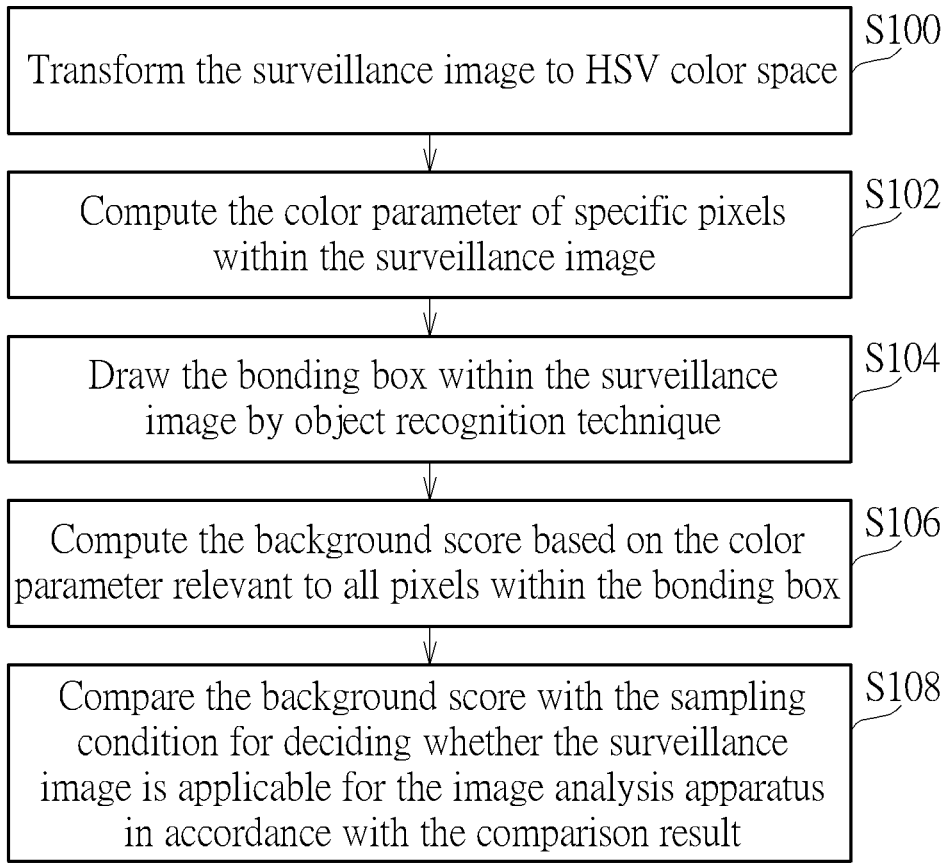
FIG. 2 is a flow chart of an object sampling method according to the embodiment of the present invention.

Please refer to FIG. 2 to FIG. 6. FIG. 2 is a flow chart of an object sampling method according to the embodiment of the present invention. FIG. 3 to FIG. 6 are diagrams of a surveillance image I acquired by the image analysis apparatus 10 at different points of time according to the embodiment of the present invention. The object sampling method illustrated in FIG. 2 can be applied for the image analysis apparatus 10 shown in FIG. 1. First, step S100 and step S102 can be executed to transform one or some surveillance images I in the image stream from RGB color space to HSV color space, and compute at least one color parameter of saturation and brightness variation of specific pixels within the surveillance image I. Step S100 can utilize the surveillance images I to compute and set a corresponding background image Ib; the object sampling method can transform the color space of the surveillance image I acquired in every predefined period, so as to set the background image Ib corresponding to each predefined period, and have a purpose of continuously updating the color parameter change of the background image Ib acquired by the image receiver 12. The predefined period can be ten minutes or half an hour, which depends on environment in an area where the image analysis apparatus 10 is located.

Figure 3:
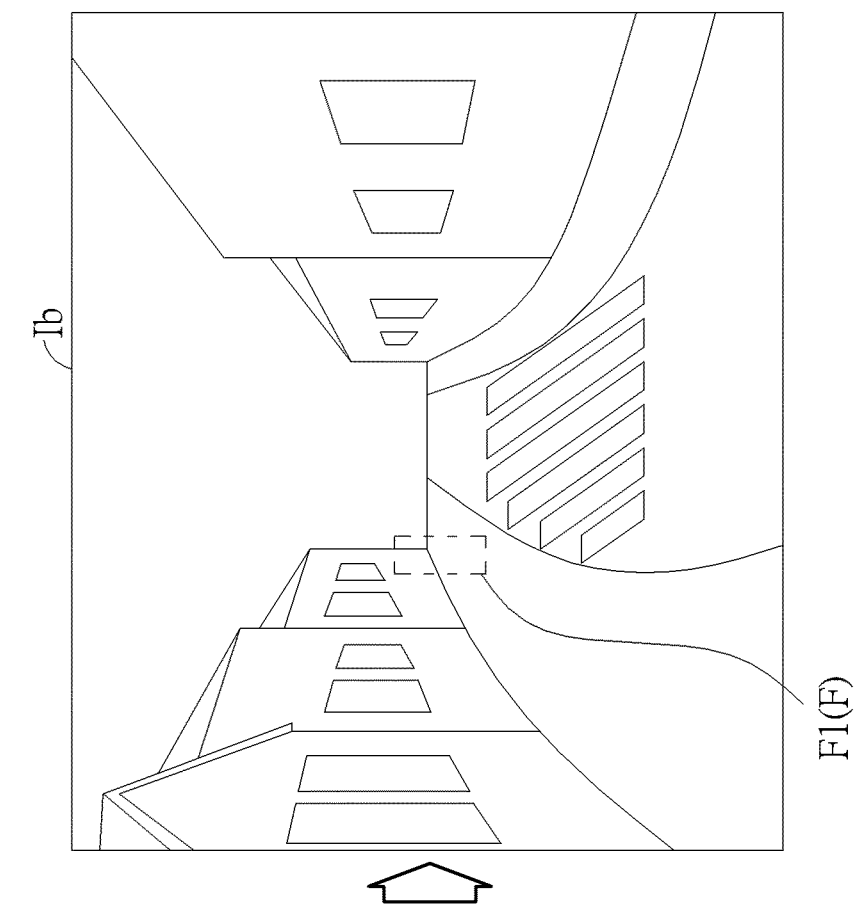
FIG. 3 to FIG. 6 are diagrams of a surveillance image acquired by the image analysis apparatus at different points of time according to the embodiment of the present invention.
Figure 3:
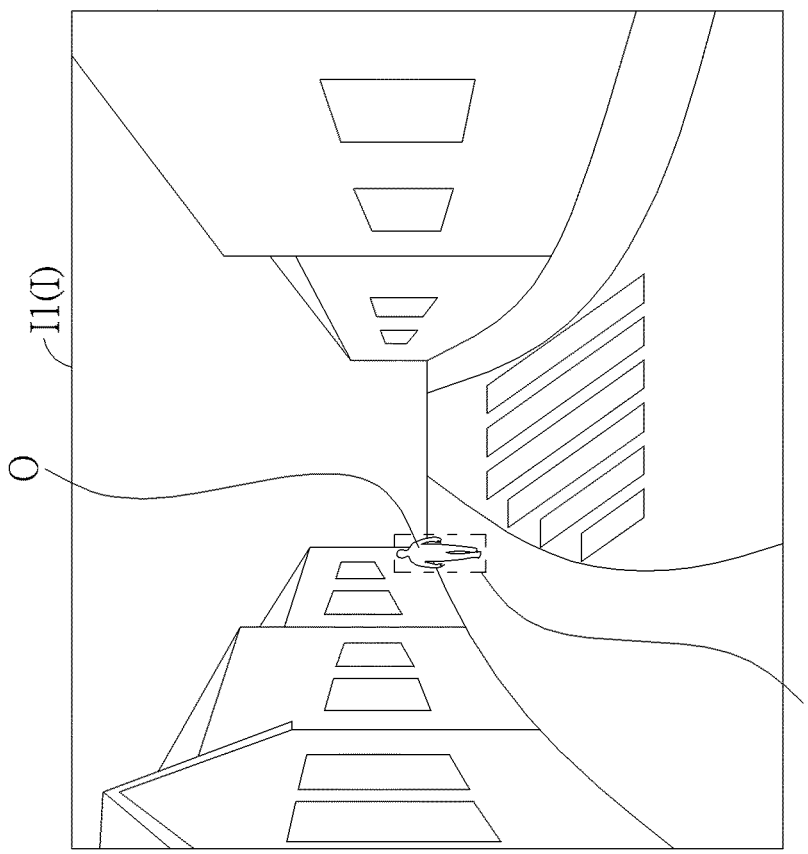
Figure 4:
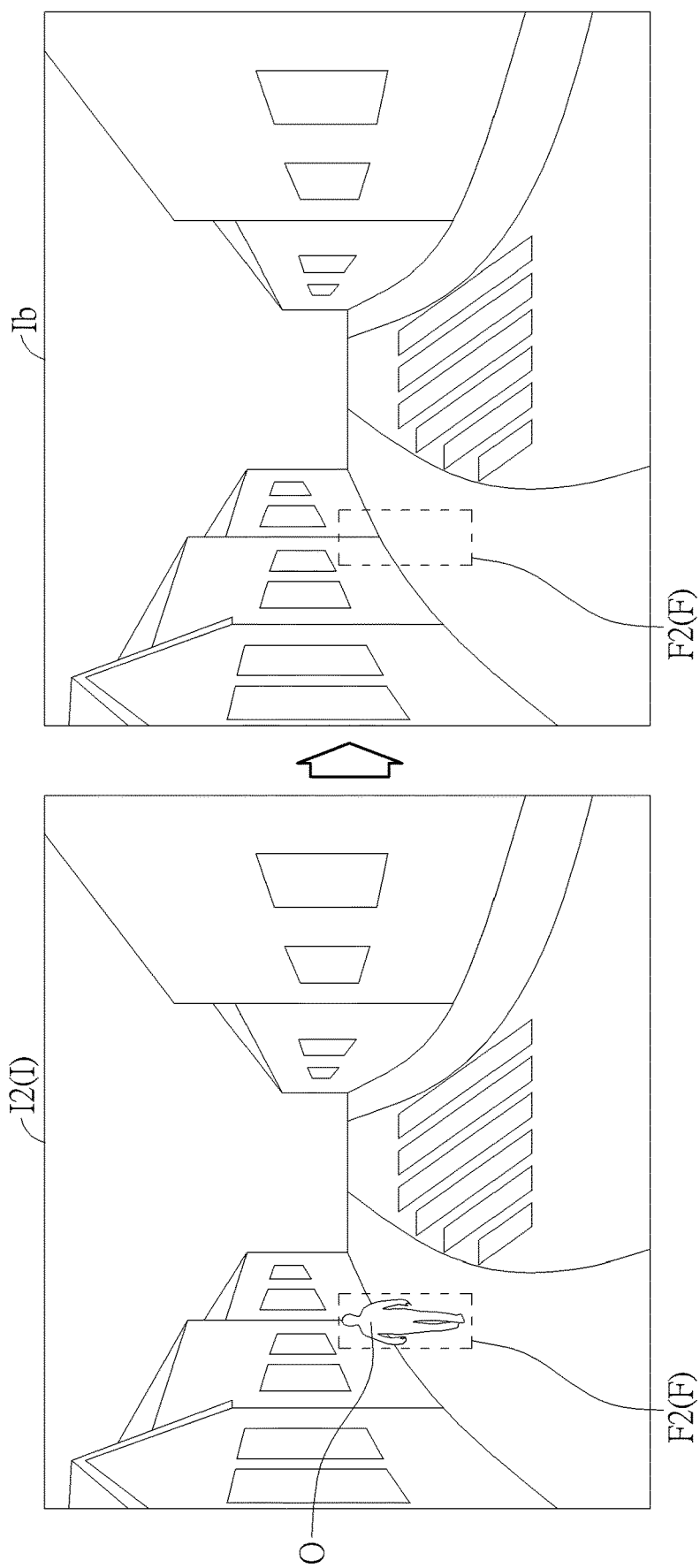
Figure 5:
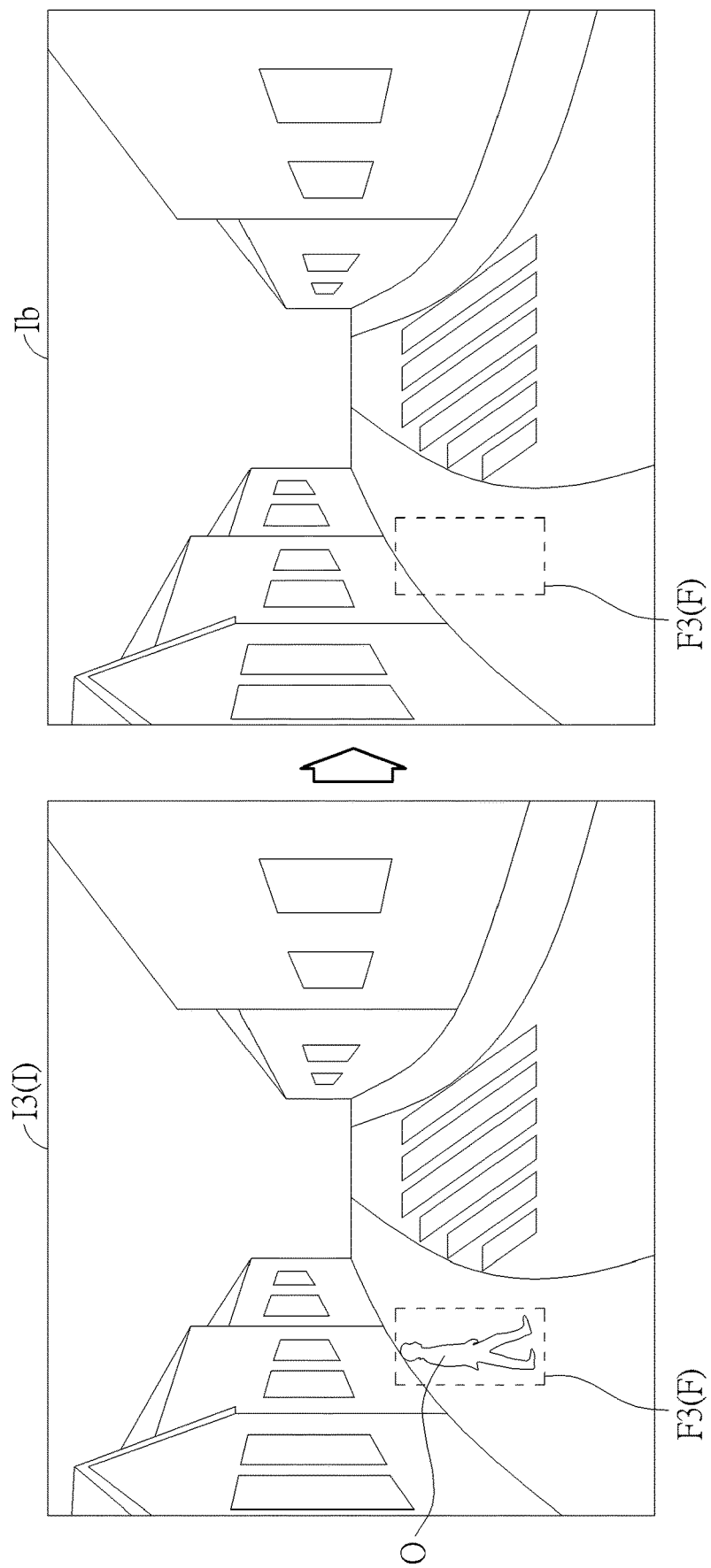
Figure 6:
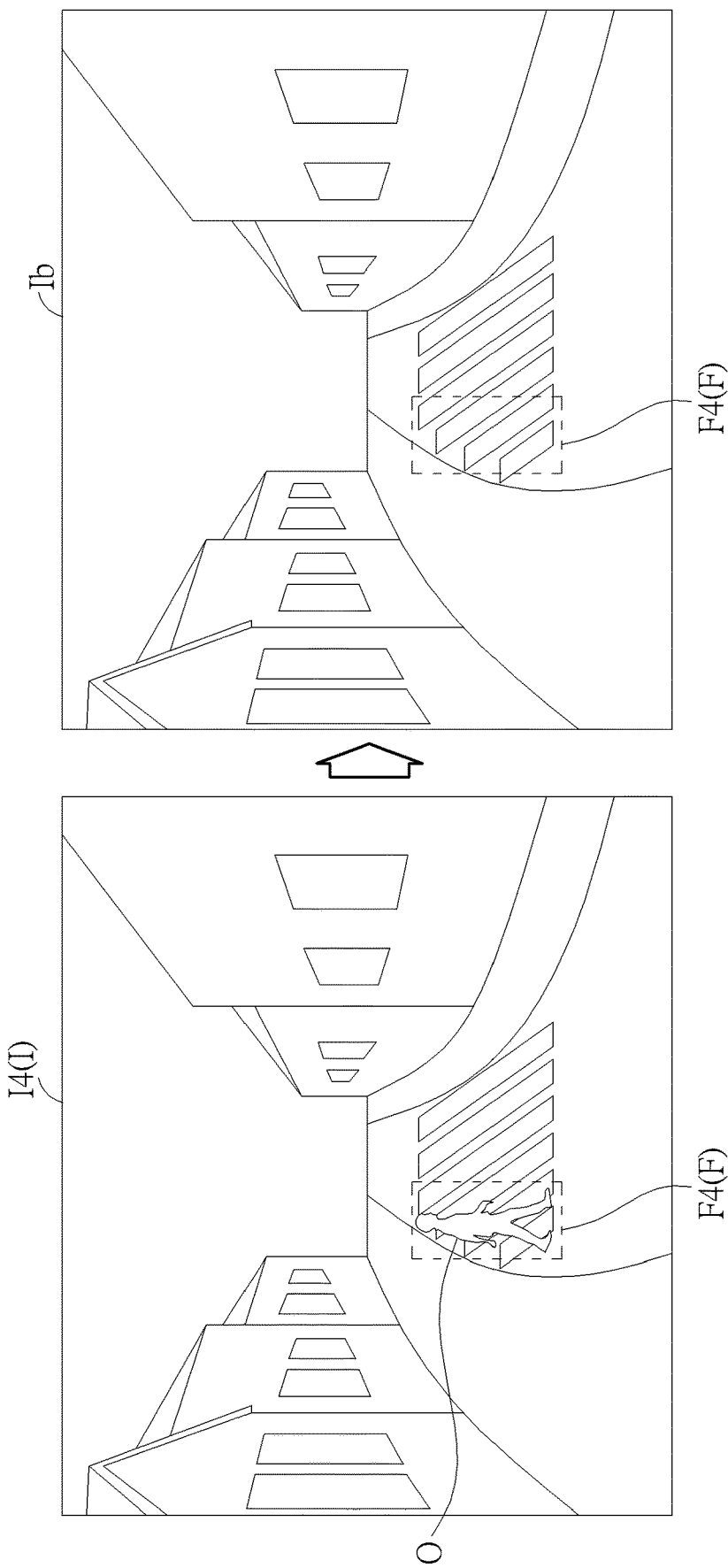

After that, step S104 can be executed to search a target object O inside the surveillance image I for setting a bonding box F by object recognition technique. Step S104 can search the target object O inside the real-time surveillance images I1-I4 to set the related bonding boxes F1-F4, and then set the bonding boxes F1-F4 without the target object O at corresponding position inside the background image Ib. The foresaid object recognition technique can optionally be common deep learning technique or any applicable image analysis technique, for tracking the target object O and executing extraction of the feature vector. Position of the tracked target object O inside the surveillance image I can be marked by the bonding box F. Generally, the target object O can be a pedestrian, and the object recognition technique can extract the feature vector of the human face or the human body for tracking, and utilize the bonding box F to mark and indicate position and a size of the pedestrian. As shown in FIG. 3 to FIG. 5, the target object O approaches the image analysis apparatus 10 from a far side of the surveillance region; as shown in FIG. 5 and FIG. 6, the target object O walks to across the road sideways. As shown in FIG. 6, the target object O stays on the crosswalk; in the meantime, background color of the surveillance image I and the related background image Ib can be colorful and have obvious edges (which corresponds to stripes of the crosswalk), which results in recognition interference and cannot be applied for the object sampling method of the present invention.

In the first form of the embodiment, the specific pixels in step S102 can be all pixels within the bonding box F, so that step S104 can be optionally executed for a start to set the bonding box F within the background image Ib, and then acquire the color parameter of the specific pixels (which means all pixels within the bonding box F) for related computation. The object sampling method of the present invention can only compute the saturation of all pixels within the bonding box F, or compute the brightness variation of all pixels within the bonding box F, or compute an evaluation value of the saturation and the brightness variation of all pixels within the bonding box F, or compute the saturation of all pixels within the bonding box F of the surveillance image I acquired at some point of time and further compute the brightness variation of all pixels within the bonding box F of the surveillance image I acquired at other point of time. The design purpose of the present invention is to find out the surveillance image I having the target object O stayed with a plain background (which means the background is not colorful or has low color saturation) and/or a background with slowly changed greyscale (which means the background has no obvious edge change or has low brightness variation), and acquire the bonding box F from the background image Ib corresponding to the found surveillance image I, so as to decide whether the said surveillance image I conforms to an actual demand. The surveillance image I that conforms to the actual demand can be compared with a searching image, for increasing speed and accuracy of an object sampling and tracking result generated by the image analysis apparatus 10. Application of the color parameter, such as the saturation and the brightness variation, is not limited to the foresaid embodiment, and depends on the design demand.

In the second form of the embodiment, the specific pixels in step S102 can be all pixels within the surveillance image I. The object sampling method of the present invention can compute the saturation of all pixels within the surveillance image I, or compute the brightness variation of all pixels within the surveillance image I, or compute the evaluation value of the saturation and the brightness variation of all pixels within the surveillance image I, or compute the saturation of all pixels within the surveillance image I acquired at some point of time and further compute the brightness variation of all pixels within the surveillance image I acquired at other point of time, for setting the related background image Ib. The second form can continuously update the color parameter change of the background image Ib acquired by the image receiver 12, which means the color space of the surveillance image I can be transformed in every predefined period; the present invention can find out the surveillance image I having the target object O stayed with the plain background and/or the background with the slowly changed greyscale for reduction of systematic computation, and further increase recognition performance of the image analysis apparatus 10.

Then, step S106 can be executed to compute a background score based on the saturation and/or the brightness variation relevant to all pixels within the bonding box F of the background image Ib. The object sampling method of the present invention can optionally apply normalization process for the saturation to acquire the background score. For example, the object sampling method of the present invention can add up the saturation of all pixels within the bonding box F to be further divided by a number of all pixels for acquiring the normalized saturation. Besides, the object sampling method of the present invention can optionally apply the normalization process for the brightness variation to acquire the background score. For example, the object sampling method of the present invention can add up the brightness variation of all pixels within the bonding box F to be further divided by the number of all pixels for acquiring the normalized brightness variation. Moreover, the present invention can only apply the normalization process for the saturation and/or the brightness variation of some pixels exceeding a predetermined threshold within the bonding box F.

If step S102 computes the saturation and the brightness variation of the specific pixels within the surveillance image I, the object sampling method of the present invention can apply the normalization process both for the saturation and the brightness variation, and the normalized saturation and the normalized brightness variation can be used to compute the background score. For utilizing the saturation and the brightness variation to compute the background score, the object sampling method of the present invention can compute a weighting value of the brightness variation (or the saturation) and a predefined weight, and then compute a reciprocal value or an absolute value or a negative value of a sum of the foresaid weighting value and the saturation (or the brightness variation) for setting as the background score. The predefined weight can be used to adjust a ratio of the brightness variation to the saturation in the background score; an actual value of the predefined weight can depend on the design demand. The weighting computation between the brightness variation and the saturation can be applied by any linear formula or other nonlinear formula.

Final, step S108 can be executed to compare the background score with a first sampling condition, and decide whether each surveillance image I can be applicable for the image analysis apparatus 10 in accordance with a comparison result of comparing the foreground score with the first sampling condition. In formula 1, the background score is increased in response to decrease of the normalized saturation and the normalized brightness variation. The first sampling condition can be a predefined value set by the design demand. If the background score is greater than or equal to the first sampling condition, the bonding box F of the surveillance image I can be interpreted as having the lower color saturation and the lower brightness variation, and the target object O may walk on the sidewalk or other area without bright color or sharp edges, as shown in FIG. 3 to FIG. 5, and the surveillance images I1, I2 and I3 can be applicable for the image analysis apparatus 10. If the background score is smaller than the first sampling condition, the bonding box F of the surveillance image I can be interpreted as having the higher color saturation and the higher brightness variation, and the target object O may stay on the crosswalk or other area with the high color saturation or the sharp edges, as shown in FIG. 6, and the surveillance image I4 is not used for the following object tracking computation.

Background score=−(Normalized saturation+ Weight*Normalized brightness variation)    Formula 1

It should be mentioned that there may be several surveillance images I in which the background score of the bonding box F is greater than or equal to the first sampling condition in step S108, and the object sampling method of the present invention can optionally apply all the foresaid surveillance images I for the following object tracking computation; in addition, the object sampling method of the present invention may compute a weighting value or a cluster analysis result of the feature vectors of each bonding box F within the foresaid surveillance images I, and provide an aim of eliminating some noise or unexpected error detection results or choosing an appropriate sampling object based on a statistical result, so that the object sampling method of the present invention can find out the surveillance images I with preferred object detection accuracy and apply the found surveillance images I to the image analysis apparatus 10 for the following object tracking computation.

In other possible form, the object sampling method of the present invention can further utilize image analysis technique to acquire at least one of a clarity, a bonding box and a masking rate of the bonding box F, and compute a foreground score of each surveillance image I based on the clarity, the bonding box and/or the occlusion ratio of the bonding box F. The foreground score can be defined as resolution of the bonding box F and the related target object O. The foreground score is not limited to be computed by foresaid factors, such as the clarity, the bonding box and the occlusion ratio, and depends on the design demand. The object sampling method of the present invention can choose one or some of the foresaid factors to compute the foreground score; if the foreground score includes several factors, a plurality of weights can be optionally set for a combination of the factors; for example, a first weighting value of the clarity and the first weight can be computed, and a second weighting value of the bonding box and the second weight can be computed, then a sum of the first weighting value, the second weighting value and the occlusion ratio can be computed for setting as the foreground score.

Computation of the foreground score is not limited to the foresaid embodiment, and depends on the design demand. The object sampling method of the present invention can compare the foreground score with a second sampling condition, and decide whether each surveillance image I can be applicable for the following object tracking computation of the image analysis apparatus 10 in accordance with a comparison result of comparing the foreground score with the second sampling condition; a comparison and decision manner of the foreground score and the second sampling condition can be similar to application of the background score and the first sampling condition, and a detailed description is omitted herein for simplicity.

The present invention can analyze each surveillance image I in the image stream to select the applicable surveillance image I based on the comparison result of the background score and the first sampling condition, and then select the more applicable surveillance image I from the remaining surveillance image I (which means the selected applicable surveillance image I as mentioned above) based on the comparison result of the foreground score and the second sampling condition, so that the retained surveillance image I (which means the selected more applicable surveillance image I as mentioned above) can have advantages of low interference background and high resolution foreground and be applicable to the image analysis apparatus 10 for the preferred recognition performance. Besides, the present invention may execute first selection of the surveillance image I based on the comparison result of the foreground score and the second sampling condition, and then execute second selection of the surveillance image I based on the comparison result of the background score and the first sampling condition, for finding out the most applicable surveillance image I. In other possible embodiment, the present invention can simultaneously execute two comparisons of the background score and the foreground score for each surveillance image I, which means one surveillance image I is used to extract the feature vector for comparing with the searching image provided by the image analysis apparatus 10 when the background score and the foreground score of the said surveillance image I respectively conform to the first sampling condition and the second sampling condition.

In conclusion, the present invention can utilize one or several surveillance images I (such as the surveillance images I1~I4) of the image stream in the predefined period to set the related background image Ib; for example, the color parameter of the specific pixels within each surveillance image I can be computed to generate the required background image Ib. The background image Ib may be updated in response to change of the environment, such as a vehicle appearing to park on the road, by acquiring one or several surveillance images I in the predefined period to set the updated background image Ib. Then, the present invention can apply the object recognition to the surveillance image I for generating the bonding box F, and set the bonding boxes F1~F4 of the surveillance images I1~I4 captured at different points of time accordingly within the background image Ib; for example, as shown in FIG. 3 to FIG. 6, position of the bonding boxes F1~F4 within the background images Ib can respectively correspond to the bonding boxes F1~F4 within the surveillance images I1~I4. Then, the present invention can compute the background score based on the color parameter relevant to all pixels within the bonding boxes F1~F4 of the background image Ib, and utilize the comparison result of the background score and the first sampling condition to find out the applicable surveillance image I from the surveillance images I1~I4 for applying to the image analysis apparatus 10.

Therefore, the object sampling method and the image analysis apparatus of the present invention can preferably utilize the saturation and the brightness variation of the surveillance image to generate the background image, set the bonding box within the surveillance image by the object recognition technique, and compute the background score of the color parameter of the pixels within the background image located at position corresponding to the bonding box within the surveillance image. Then, the present invention does not select the surveillance image with the bright color background or the background having sharp edges for the following object tracking computation in accordance with the comparison result of the background score and the first sampling condition; the bonding box of the remaining surveillance image can have the plain background and/or the background with the slowly changed greyscale, and can effectively avoid background interference and increase the recognition accuracy when comparing with the searching image. The image analysis apparatus of the present invention can include on or several image receivers; if the operation processor receives the searching image provided from one of the image receivers, the operation processor can utilize the object sampling method to rapidly analyze the surveillance image acquired by the said image receiver at another point of time, and further analyze the surveillance image acquired by other image receiver at any point of time, so as to select the surveillance images that are not interfered by the background, for effectively decreasing the systematic computation and increasing the recognition speed and accuracy of the object tracking computation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An object sampling method applied to an image analysis apparatus with an image receiver and an operation processor, the image receiver acquiring an image stream, the object sampling method comprising:
    the operation processor transforming color space of at least one surveillance image in the image stream, and computing saturation of specific pixels within the at least one surveillance image;
    the operation processor setting a bonding box within the at least one surveillance image; and
    the operation processor computing a background score based on a saturation relevant to all pixels in the bonding box, and comparing the background score with a first sampling condition, so as to determine whether the at least one surveillance image is applicable for the image analysis apparatus in accordance with a comparison result of comparing the background score with the first sampling condition.

2. The object sampling method of claim 1, wherein the specific pixels are all pixels within the at least one surveillance image.

3. The object sampling method of claim 1, wherein the specific pixels are all pixels within the bonding box.

4. The object sampling method of claim 1, wherein the at least one surveillance image comprises a plurality of surveillance images, the object sampling method further comprising:
    the operation processor computing a weighting value and a cluster analysis result of each feature vector of several bonding boxes in the plurality of surveillance images for applying to the image analysis apparatus when each background score of the several bonding boxes conforms to the first sampling condition.

5. The object sampling method of claim 1, further comprising:
    the operation processor transforming the color space of the at least one surveillance image to compute brightness variation of the specific pixels; and
    the operation processor computing the background score relevant to the all pixels within the bonding box based on the saturation and the brightness variation.

6. The object sampling method of claim 5, further comprising:
    the operation processor computing a weighting value of the brightness variation and a weight, and further computing a reciprocal value or an absolute value of a sum of the weighting value and the saturation for setting as the background score.

7. The object sampling method of claim 5, further comprising:
    the operation processor applying normalization process for the saturation and the brightness variation, and utilizing the normalized saturation and the normalized brightness variation to compute the background score.

8. The object sampling method of claim 3, further comprising:
    the operation processor utilizing image analysis technique to acquire at least one of a clarity, a box size and a occlusion ratio of the bonding box;
    the operation processor computing a foreground score of the bonding box based on the clarity, the box size and/or the masking rate; and
    the operation processor comparing the foreground score with a second sampling condition, so as to determine whether the at least one surveillance image is applicable for the image analysis apparatus in accordance with a comparison result of comparing the foreground score with the second sampling condition.

9. The object sampling method of claim 8, further comprising:
    the operation processor computing a first weighting value of the clarity and a first weight;
    the operation processor computing a second weighting value of the box size and a second weight; and
    the operation processor computing a sum of the first weighting value, the second weighting value and the masking rate for setting as the foreground score.

10. The object sampling method of claim 8, further comprising:
    the operation processor extracting a feature vector of the at least one surveillance image to compare with a searching image provided by the image analysis apparatus when the background score conforms to the first sampling condition and the foreground score conforms to the second sampling condition.

11. An image analysis apparatus, comprising:
an image receiver adapted to acquire an image stream; and
an operation processor electrically connected to the image receiver, and adapted to transform color space of at least one surveillance image in the image stream for computing saturation of specific pixels within the at least one surveillance image, set a bonding box within the at least one surveillance image, and compute a background score based on a saturation relevant to all pixels in the bonding box and compare the background score with a first sampling condition, so as to determine whether the at least one surveillance image is applicable for the image analysis apparatus in accordance with a comparison result of comparing the background score with the first sampling condition.

12. The image analysis apparatus of claim 11, wherein the specific pixels are all pixels within the at least one surveillance image.

13. The image analysis apparatus of claim 11, wherein the specific pixels are all pixels within the bonding box.

14. The image analysis apparatus of claim 11, wherein the at least one surveillance image comprises a plurality of surveillance images, the operation processor is adapted to further compute a weighting value and a cluster analysis result of a feature vector of several bonding boxes in the plurality of surveillance images for applying to the image analysis apparatus when each background score of the several bonding boxes conforms to the first sampling condition.

15. The image analysis apparatus of claim 11, wherein the operation processor is adapted to further transform the color space of the at least one surveillance image for computing brightness variation of the specific pixels, and compute the background score relevant to the all pixels within the bonding box based on the saturation and the brightness variation.

16. The image analysis apparatus of claim 15, wherein the operation processor is adapted to further compute a weighting value of the brightness variation and a weight, and then compute a reciprocal value or an absolute value of a sum of the weighting value and the saturation for setting as the background score.

17. The image analysis apparatus of claim 15, wherein the operation processor is adapted to further apply normalization process for the saturation and the brightness variation, and utilize the normalized saturation and the normalized brightness variation to compute the background score.

18. The image analysis apparatus of claim 13, wherein the operation processor is adapted to further utilize image analysis technique to acquire at least one of a clarity, a box size and a masking rate of the bonding box, compute a foreground score of the bonding box based on the clarity, the box size and/or the occlusion ratio, and compare the foreground score with a second sampling condition, so as to determine whether the at least one surveillance image is applicable for the image analysis apparatus in accordance with a comparison result of comparing the foreground score with the second sampling condition.

19. The image analysis apparatus of claim 18, wherein the operation processor is adapted to further compute a first weighting value of the clarity and a first weight, compute a second weighting value of the box size and a second weight, and compute a sum of the first weighting value, the second weighting value and the occlusion ratio for setting as the foreground score.

20. The image analysis apparatus of claim 18, wherein the operation processor is adapted to further extract a feature vector of the at least one surveillance image for comparing with a searching image provided by the image analysis apparatus when the background score conforms to the first sampling condition and the foreground score conforms to the second sampling condition.

* * * * *